Patented Sept. 25, 1934

1,974,724

UNITED STATES PATENT OFFICE 1,974,724

PROCESS FOR REFINING MINERAL OILS

Ludwig Rosenstein, San Francisco, Calif., assignor to Shell Development Company, San Francisco, Calif., a corporation of Delaware No Drawing. Application March 23, 1931, Serial No. 524,753

20 Claims. (Cl. 196—24)

This invention relates generally to the purification of crude mineral oil, its distillates (obtained by distillation or cracking) and mineral oil residues, and has for its object the removal therefrom of organic sulfur compounds, elementary sulfur phenolic bodies, sulfonic acids and other acidic constituents.

For commercial reasons, my invention can be advantageously employed in connection with products such as gasoline, kerosene, pressure distillate and the like, resulting from the cracking of mineral oils.

Crude mineral oil and its products are of complex constitution depending upon the source of the material and the type of treatment it undergoes. As a result, one cannot predict the true analysis of any mineral oil product. Amongst other things, these products contain phenolic bodies, hydrogen sulfide, free sulfur and organic sulfur bodies such as mercaptans, thioethers, thiophenes, sulfonic acids and disulfides.

I have discovered that anhydrous liquid ammonia or substantially anhydrous liquid ammonia can be utilized effectively in removing the aforementioned sulfur bodies and phenolic bodies from crude mineral oil and its products. Where the mineral oil material has been treated with sulfuric acid, the anhydrous liquid ammonia can be used in lieu of the sodium hydroxide commonly employed. Thus in one operation, use is made of a volatile and easily recoverable alkali which neutralizes the acidic character of the acid-treated material and which effects the removal of the aforementioned undesirable and malodorous bodies. I desire to state herein that my process is not concerned especially with the removal of hydrogen sulfide as this is easily removed by other well known processes and it is preferable to do so.

Anhydrous liquid ammonia dissolves free sulfur, phenolic bodies, many organic acids and mercaptans very readily. Other organic sulfur compounds such as thiophenes and thioethers do not dissolve very readily but distribute themselves between the mineral oil and the liquid ammonia. The greatest difficulty is experienced with the removal of organic disulfides as these compounds have an unfavorable distribution ratio. I have discovered that if the disulfide content of mineral oils is converted to mercaptans by reduction, substantially complete removal of the aforementioned undesirable and malodorous bodies is easily effected by treatment with anhydrous liquid ammonia. The reducing action may take place prior to and independently of the ammonia treatment or the reducing agent may be contained in the liquid ammonia. Some reducing agents, soluble in anhydrous liquid ammonia, which are particularly effective in reducing the disulfide content of mineral oils are ammonium sulfide, sodium sulfide, potassium sulfide, ammono-sulfurous acid, sulfur, cyanides, hydroxylamine, hydrazine and the like. For example, ammonium sulfide dissolved in liquid ammonia reacts with disulfides to form mercaptans and free sulfur and these are then readily extracted by the liquid ammonia.

The reaction of the sulfur bodies with reducing agents is greatly facilitated by adding to the liquid ammonia, substances which have the nature of amides soluble in liquid anhydrous ammonia—such as sodium amide, potassium amide and the like. In other cases, the reaction is facilitated by adding to the anhydrous liquid ammonia, ammonium salts soluble in liquid ammonia but not possessing oxidizing properties— such as ammonium chloride, ammonium acetate, ammonium nitrate and the like.

The extraction of the sulfur content from the oil may also be facilitated by adding to or dissolving in the liquid ammonia, substances which will react with the organic sulfur bodies so as to remove the sulfur therefrom, forming therewith compounds readily soluble in liquid ammonia. Sodium cyanide, potassium cyanide and ammonium cyanide are examples of such compounds which react with certain sulfur bodies to form thiocyanates, which are readily soluble in liquid ammonia.

If desired, the various facilitating agents may be added to the oil prior to and independently of the liquid ammonia treatment.

Whether a body or compound is suspended or dissolved in anhydrous liquid ammonia, is a matter not of practical importance and when it is stated that a body is dissolved it is meant to likewise convey suspension of particles approaching molecular dimensions.

Contrary to most beliefs and statements by prior inventors, anhydrous liquid ammonia is substantially immiscible with mineral oil. Consequently, mineral oil material contacted or agitated with anhydrous liquid ammonia eventually resolves itself and one obtains a liquid oil phase and a liquid ammonia phase, the latter being uppermost. If the contact of the two materials is brought about in the presence of one or more of the following: reducing agents, modifying agents and cyanides, substantially complete separation of the two liquids is simply and easily effected as by drawing off the oil layer or by decanting the ammonia layer containing the aforementioned undesirable and malodorous bodies.

In carrying out the mechanics of the process, I preferably run the oil product into a suitable cylinder, close off the oil supply and introduce under pressure the desired quantity (usually a volume equal to that of the oil) of anhydrous liquid ammonia carrying in solution or suspension the chemicals necessary to effect the desired reaction, depending on the sulfur content of the oil and the nature of the sulfur bodies to be removed. The two immiscible liquids are then brought into intimate contact by any suitable agitation, or if desired, the treating liquid may be forced through the oil from beneath in a continuous stream for a time necessary to complete the reaction.

Some oils may require successive extractions or treatment separately with different chemical agents dissolved in the ammonia in order to give them the desired purity.

After a test of the oil shows the sulfur and phenolic content to have been satisfactorily reduced, the liquids are permitted to stand for a few minutes to enable the ammonia to rise and float on the purified oil so that the latter may be drawn off from below, and a new charge of oil pumped in for treatment. Or, if desired, the liquids may be more rapidly separated by centrifugal action, all carried out under pressure.

If desired, both liquids may be run off into another closed vessel for gravity separation, or heat may be applied to the liquid ammonia in this receptacle (after drawing off the purified oil), to drive the ammonia over into a condenser for further use and thus deposit its dissolved impurities in this receptacle.

Many other variations of the mechanical handling of the process will readily suggest themselves to the industrial chemist, the chief objective being the ridding of the ammonia of its dissolved or suspended content, impregnating the ammonia with the desired fresh chemical agents and using it again in treatment of new batches of oil product, and of course in carrying this out on a large scale, recourse will be had to suitable countercurrent and continuous methods of treatment of liquids under pressure, many of which are well known in the art.

By the expression "anhydrous liquid ammonia" is meant the liquid ammonia of commerce, which is substantially 100% $NH_3$ but contains traces of moisture and other impurities.

The expression "mineral oil" in the claims is meant to embrace such examples as crude mineral oils, derived from any source, mineral oil fractions obtained by distillation or cracking including straight run products and cracked distillates such as gasoline, kerosene, illuminating oils, pressure distillate, lubricating oils and the like and mineral oil residues available in any number of mineral oil treatments.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim:

1. A process of purifying mineral oil comprising extracting the sulfur bodies and other impurities from the oil with anhydrous liquid ammonia at a temperature and pressure at which both materials are in the liquid phase, causing the liquid mixture to separate into an essentially ammonia-layer predominantly composed of ammonia and an oil-layer and effecting the separation of the two liquid layers without the aid of water.

2. A process of purifying mineral oil extracting the sulfur bodies and other impurities from comprising the oil with anhydrous liquid ammonia at a temperature and pressure at which both materials are in the liquid phase, causing the liquid mixture to separate into an essentially ammonia-layer predominantly composed of ammonia and an oil-layer and effecting the separation of the two liquid layers by gravity.

3. A process of purifying mineral oil comprising extracting the sulfur bodies and other impurities from the oil with anhydrous liquid ammonia at a temperature and pressure at which both materials are in the liquid phase, causing the liquid mixture to separate into an essentially ammonia-layer predominantly composed of ammonia and an oil-layer, effecting the separation of the two liquid layers without the aid of water and recovering the ammonia from the impurities dissolved therein.

4. A process of purifying mineral oil comprising extracting the sulfur bodies and other impurities from the oil with anhydrous liquid ammonia at a temperature and pressure at which both materials are in the liquid phase, causing the liquid mixture to separate into an essentially ammonia-layer predominantly composed of ammonia and an oil-layer, effecting the separation of the two liquid layers by gravity and recovering the ammonia from the impurities dissolved therein.

5. A continuous process of purifying mineral oil comprising extracting the sulfur bodies and other impurities from the oil with anhydrous liquid ammonia at a temperature and pressure at which both materials are in the liquid phase, causing the liquid mixture to separate into an essentially ammonia-layer predominantly composed of ammonia and an oil-layer, effecting the separation of the two liquid layers without the aid of water, recovering the ammonia from the impurities dissolved therein and recycling the recovered ammonia for further treatment of the mineral oil.

6. A continuous process of purifying mineral oil comprising extracting the sulfur bodies and other impurities from the oil with anhydrous liquid ammonia at a temperature and pressure at which both materials are in the liquid phase, causing the liquid mixture to separate into an essentially ammonia-layer predominantly composed of ammonia and an oil layer, effecting the separation of the two liquid layers by gravity, recovering the ammonia from the impurities dissolved therein and recycling the recovered ammonia for further treatment of the mineral oil.

7. A continuous process of purifying mineral oil comprising continuously extracting the sulfur bodies and other impurities from the oil with anhydrous liquid ammonia at a temperature and pressure at which both materials are in the liquid phase, causing the liquid mixture to separate into an essentially ammonia-layer predominantly composed of ammonia and an oil-layer and effecting the separation of the two layers without the aid of water.

8. A continuous process of purifying mineral oil comprising continuously extracting the sulfur bodies and other impurities from the oil with anhydrous liquid ammonia at a temperature and pressure at which both materials are in the liquid phase, causing the liquid mixture to separate into an essentially ammonia-layer predominantly composed of ammonia and an oil layer and effecting the separation of the two layers by gravity.

9. In a process of purifying mineral oil, the steps of extracting the sulfur bodies and other impurities from mineral oil with anhydrous liquid ammonia at a temperature and pressure at which both materials are in the liquid phase until substantially complete removal of undesirable bodies is effected, causing the liquid mixture to separate into an essentially ammonia-lower predominantly composed of ammonia and an oil-layer and effecting the separation of the two layers without the aid of water.

10. In a process of purifying mineral oil, the steps of extracting the sulfur bodies and other impurities from mineral oil with anhydrous liquid ammonia at a temperature and pressure at which both materials are in the liquid phase until substantially complete removal of undesirable bodies is effected, causing the liquid mixture to separate into an essentially ammonia-layer predominantly composed of ammonia and an oil-layer and effecting the separation of the two layers by gravity.

11. A process of purifying mineral oil extracting the sulfur bodies and other impurities from comprising the oil with anhydrous liquid ammonia at a temperature and pressure at which both materials are in the liquid phase in the presence of at least one non-acidic non-alcoholic chemical agent which modifies the sulfur bodies so as to make them more amenable to solution in the ammonia, causing the liquid mixture to separate into an essentially ammonia-layer predominantly composed of ammonia containing a major portion of the dissolved undesirable bodies and an oil-layer and effecting the separation of the two liquid layers without the aid of water.

12. A process of purifying mineral oil extracting the sulfur bodies and other impurities from comprising the oil with anhydrous liquid ammonia at a temperature and pressure at which both materials are in the liquid phase in the presence of at least one non-acidic non-alcoholic chemical agent which modifies the sulfur bodies so as to make them more amenable to solution in the ammonia, causing the liquid mixture to separate into an essentially ammonia-layer predominantly composed of ammonia containing a major portion of the dissolved undersirable bodies and an oil-layer and effecting the separation of the two liquid layers by gravity.

13. A process of purifying mineral oil comprising extracting the sulfur bodies and other impurities from the oil with anhydrous liquid ammonia at a temperature and pressure at which both materials are in the liquid phase in the presence of at least one non-acidic non-alcoholic chemical agent which modifies the sulfur bodies so as to make them more amenable to solution in the ammonia, causing the liquid mixture to separate into an essentially ammonia-layer, predominately composed of ammonia containing a major proportion of the dissolved undesirable bodies and an oil-layer, effecting the separation of the two liquid layers without the aid of water and recovering the ammonia from the impurities dissolved therein.

14. A process of purifying mineral oil comprising extracting the sulfur bodies and other impurities from the oil with anhydrous liquid ammonia at a temperature and pressure at which both materials are in the liquid phase in the presence of at least one non-acidic non-alcoholic chemical agent which modifies the sulfur bodies so as to make them more amenable to solution in the ammonia, causing the liquid mixture to separate into an essentially ammonia-layer predominantly composed of ammonia containing a major proportion of the dissolved undesirable bodies and an oil-layer, effecting the separation of the two liquid layers by gravity and recovering the ammonia from the impurities dissolved therein.

15. A continuous process of purifying mineral oil comprising extracting the sulfur bodies and other impurities from the oil with anhydrous liquid ammonia at a temperature and pressure at which both materials are in the liquid phase in the presence of at least one non-acidic non-alcoholic chemical agent which modifies the sulfur bodies so as to make them more amenable to solution in the ammonia, causing the liquid mixture to separate into an essentially ammonia-layer predominantly composed of ammonia containing a major proportion of the dissolved undesirable bodies and an oil-layer, effecting the separation of the two liquid layers without the aid of water, recovering the ammonia from the impurities dissolved therein, impregnating the ammonia with the desired fresh chemical agents and recycling the recovered ammonia for further treatment of the mineral oil.

16. A continuous process of purifying mineral oil comprising extracting the sulfur bodies and other impurities from the oil with anhydrous liquid ammonia at a temperature and pressure at which both materials are in the liquid phase in the presence of at least one non-acidic non-alcoholic chemical agent which modifies the sulfur bodies so as to make them more amenable to solution in the ammonia, causing the liquid mixture to separate into an essentially ammonia-layer predominantly composed of ammonia containing a major proportion of the dissolved undesirable bodies and an oil-layer, effecting the separation of the two liquid layers by gravity, recovering the ammonia from the impurities dissolved therein and recycling the recovered ammonia for further treatment of the mineral oil.

17. A continuous process of purifying mineral oil comprising continuously extracting the sulfur bodies and other impurities from the oil with anhydrous liquid ammonia at a temperature and pressure at which both materials are in the liquid phase in the presence of at least one non-acidic non-alcoholic chemical agent which modifies the sulfur bodies so as to make them more amenable to solution in the ammonia, causing the liquid mixture to separate into an essentially ammonia-layer predominantly composed of ammonia containing a major proportion of the dissolved undesirable bodies and an oil-layer and effecting the separation of the two layers without the aid of water.

18. A continuous process of purifying mineral oil comprising continuously extracting the sulfur bodies and other impurities from the oil with anhydrous liquid ammonia at a temperature and pressure at which both materials are in the liquid phase in the presence of at least one non-acidic non-alcoholic chemical agent which modifies the sulfur bodies so as to make them more amenable to solution in the ammonia, causing the liquid mixture to separate into an essentially ammonia-layer predominantly composed of ammonia containing a major proportion of the dissolved undesirable bodies and an oil-layer and effecting the separation of the two layers by gravity.

19. In a process of purifying mineral oil, the steps of extracting the sulfur bodies and other impurities from mineral oil with anhydrous liquid ammonia at a temperature and pressure at which both materials are in the liquid phase with at least one non-acidic non-alcoholic chemical agent which modifies the sulfur bodies so as to make them more amenable to solution in the ammonia until substantially complete removal of the undesirable bodies is effected, causing the liquid mixture to separate into an essentially ammonia-layer predominantly composed of ammonia containing the dissolved undesirable bodies and an oil-layer and effecting the separation of the two layers without the aid of water.

20. In a process of purifying mineral oil the steps of extracting the sulfur bodies and other impurities from mineral oil with anhydrous liquid ammonia at a temperature and pressure at which both materials are in the liquid phase with at least one non-acidic non-alcoholic chemical agent which modifies the sulfur bodies so as to make them more amenable to solution in the ammonia until substantially complete removal of the undesirable bodies is effected, causing the liquid mixture to separate into an essentially ammonia-layer predominantly composed of ammonia containing the dissolved undesirable bodies and an oil-layer and effecting the separation of the two layers by gravity.

LUDWIG ROSENSTEIN.